United States Patent

Mueller

[11] Patent Number: 5,897,303
[45] Date of Patent: Apr. 27, 1999

[54] BLIND PORE PISTON PUMP WITH INTERNAL VALVE AND STROKE LIMITING SPRING WINDING

[75] Inventor: Erwin Mueller, Renningen, Germany

[73] Assignee: Robert Bosch GmbH, Stuttgart, Germany, DEX

[21] Appl. No.: 08/750,023

[22] PCT Filed: Mar. 9, 1996

[86] PCT No.: PCT/DE96/00485

§ 371 Date: Nov. 22, 1996

§ 102(e) Date: Nov. 22, 1996

[87] PCT Pub. No.: WO96/30648

PCT Pub. Date: Oct. 3, 1996

[30] Foreign Application Priority Data

Mar. 24, 1995 [DE] Germany ................... 195 10 745

[51] Int. Cl.⁶ .................................................. F04B 53/12
[52] U.S. Cl. ..................... 417/549; 417/501; 417/552; 417/554
[58] Field of Search ................................. 417/501, 552, 417/554, 549

[56] References Cited

U.S. PATENT DOCUMENTS

| | | | |
|---|---|---|---|
| 5,067,880 | 11/1991 | Finsterwalder et al. | 417/495 |
| 5,110,271 | 5/1992 | Hofman | 417/555.1 |
| 5,562,430 | 10/1996 | Schuller et al. | 417/545 |
| 5,588,817 | 12/1996 | Zirps et al. | 417/549 |
| 5,688,113 | 11/1997 | Bareiss et al. | 417/549 |

FOREIGN PATENT DOCUMENTS

| | | |
|---|---|---|
| 1583650 | 10/1969 | France . |
| 2017680 | 4/1970 | Germany . |

*Primary Examiner*—Charles G. Freay
*Assistant Examiner*—Ehud Gartenberg
*Attorney, Agent, or Firm*—Edwin E. Greigg; Ronald E. Greigg

[57] ABSTRACT

The invention relates to a piston pump, having a piston that has a longitudinal bore, that includes a valve seat face upon which a valve closing body is pressed by a valve spring. The valve spring is a helical compression spring, whose winding diameter increases from a winding end that engages the valve closing body to a winding end that rests on a spring seat face formed in the longitudinal bore of the piston. The piston pump of the invention has the advantage that the valve closing body along with the valve spring can be installed in the piston in an axial motion; the valve spring is directly accessible, and a correct seating of the valve and valve spring in the longitudinal bore can be checked visually after installation.

19 Claims, 2 Drawing Sheets

BLIND PORE PISTON PUMP WITH INTERNAL VALVE AND STROKE LIMITING SPRING WINDING

PRIOR ART

The invention relates to a piston pump with a piston drivable to execute a reciprocating motion, which has a longitudinal bore in which a valve closing body is disposed that is pressed against a valve seat by a valve spring also located in the longitudinal bore.

Such a piston pump is known from international patent disclosure WO 95/00759. In the known piston pump, the valve seat is embodied on a pressure-side mouth of the longitudinal bore of the piston. The valve closing body of the known piston pump has a valve plate, whose sealing face rests on the valve seat when the valve is closed. A shaft extends freely from the valve plate into the longitudinal bore of the piston. The free end of the shaft is engaged by the smaller-diameter end of the winding of a frustoconically wound helical compression spring. The larger-diameter end of the winding is braced against an inner annular shoulder, near the pressure-side mouth of the longitudinal bore of the piston, and thus presses the valve plate against the mouth of the longitudinal bore. This has the disadvantage that the valve plate covers the longitudinal bore, and thus blocks the view of the valve spring located in the longitudinal bore; visually checking the correct seating of the valve spring is thus impossible, or at best difficult. Another disadvantage is that the valve spring covered by the valve plate is not accessible during installation.

To enable installing the valve spring, which is attached to the valve shaft, in the piston, the inner annular shoulder in the longitudinal bore of the piston, which acts as a spring seat, has an interruption or protrusion at one point of its circumference. The valve closing body is introduced into the longitudinal bore together with the valve spring attached to it, with the valve shaft leading, and is rotated. In this process the windings of the frustoconically wound helical compression spring that widen in the direction of the larger-diameter end of the winding come into engagement with the interruption or protrusion of the inner annular shoulder and-"screw" into place behind the inner annular shoulder, until the larger-diameter winding end of the helical compression spring has overcome the annular shoulder and rests on the face of the shoulder that points into the longitudinal bore. Such an installation process has the disadvantage that in addition to the axial motion of the valve closing body, a rotary motion is necessary, and assurance must be provided that the valve spring gets all the way behind the inner annular shoulder. The interruption or protrusion of the inner annular shoulder must also be fabricated, which involves additional expense in piston production.

ADVANTAGES OF THE INVENTION

In the piston pump of the invention, the valve closing body is located in the interior of the longitudinal bore of the piston; the valve closing spring is located on the side toward the pressure-side mouth of the longitudinal bore, which has the advantage that the valve spring is visible through the pressure-side mouth of the longitudinal bore of the piston, through which the installation of the valve closing body and the valve spring is accomplished, and its correct seating can be checked by sight. Installation does not have to be done "blind", and the valve spring is directly accessible during installation. Another advantage of the invention is that the closing spring is installed longitudinally of the piston; a rotary motion is unnecessary.

An inner annular shoulder, which may also be part of an inner flange, and which is embodied in either fully encompassing or split form can serve as the spring seat. It is also possible for radially inwardprotruding lugs, distributed over the circumference of the longitudinal bore of the piston, to serve as the spring seat.

The valve spring continues, from its windings acting as a spring and located between the valve closing body and the spring seat, on through the larger-diameter end of the winding resting on the spring seat, into a stroke limiting portion of small diameter which extends into the interior of the longitudinal bore of the piston. This inward-extending portion is also called an indent. It can extend in a spiral or radially, for example. When the valve is maximally open, the valve closing body meets this stroke limiting portion. The advantage of a valve stroke limitation is a relatively short valve closing time with only slight spring force, where an only slight pressure difference at the valve closing body is sufficient to open the valve.

If the stroke limiting portion is not located at the level of the spring seat but instead is intended to be spaced apart from it, then the valve spring can be embodied between its larger-diameter end of the winding and the stroke limiting portion as extending with an axial component into the interior of the longitudinal bore, or as extending out of it.

BRIEF DESCRIPTION OF THE DRAWINGS

The invention will be described in further detail below in terms of an exemplary embodiment shown in the drawing. Shown are.

DESCRIPTION OF THE EXEMPLARY EMBODIMENT

Figure 1:
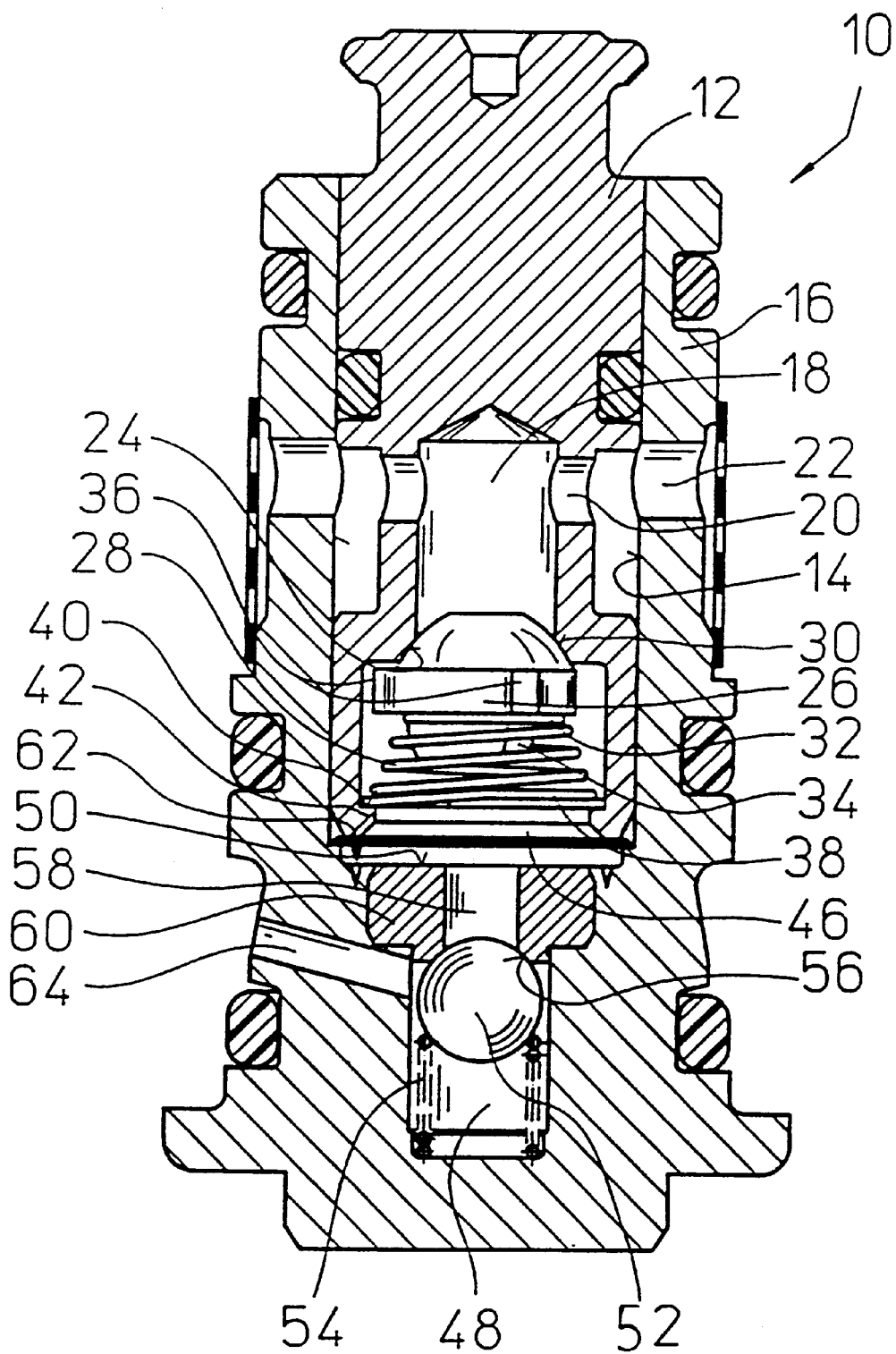
FIG. 1, an axial section through a piston pump of the invention.

The piston pump of the invention, shown in FIG. 1 and identified overall by reference numeral 10, has a piston 12, which is guided to move in an axial direction in a cylinder bore 14 of a cylinder 16.

The piston 12 has a longitudinal blind bore 18. On its closed end, through a transverse bore 20 in the piston 12, the longitudinal bore 18 communicates with fluid supply conduits 22 in the cylinder 16.

A pump inlet valve is accommodated in the piston 12 as follows: To that end the longitudinal bore 18 is embodied with a larger diameter portion in stepped fashion; it widens in its middle region, toward its open end. At the step, there is a conical valve seat face 24. A valve closing body 26 located in the longitudinal bore 18 is pressed against the valve seat face 24 by a helical compression valve spring 28. The valve closing body 26 is a rotationally symmetrical injection-molded plastic part, for instance of PEEK (polyyether etherketone). It has a sealing face 30 in the shape of a spherical zone, three centering ribs 36 that protrude radially in starlike fashion, and continues integrally with a tang 34 on its end remote from the sealing face 30. The tang 34 tapers toward its free end. On its end that merges with the valve closing body 25, the diameter of the tang 34 is somewhat larger than a winding end 32, of the valve spring 28,located there which at that point the winding end of the valve spring engages an encompassing groove (not visible) of hemispherical cross section in the valve closing body at the base of the sealing face 26.

The valve spring 28 is a frustoconically wound helical compression spring; that is, the diameter of the winding increases from the aforementioned smaller-diameter end 32 of the winding, which engages the groove of the valve closing body 26, toward an end 38 of larger diameter of the winding.

With its larger-diameter end 38 of the winding, the helical compression spring 28 is braced against a spring seat face 40, which forms an inner flange 42 on the open end of the longitudinal bore 18 of the piston 12. Toward the mouth side of the longitudinal bore 18, the inner flange 42 widens conically to form an introduction incline, for easier installation of the helical compression spring 28.

Figure 2:
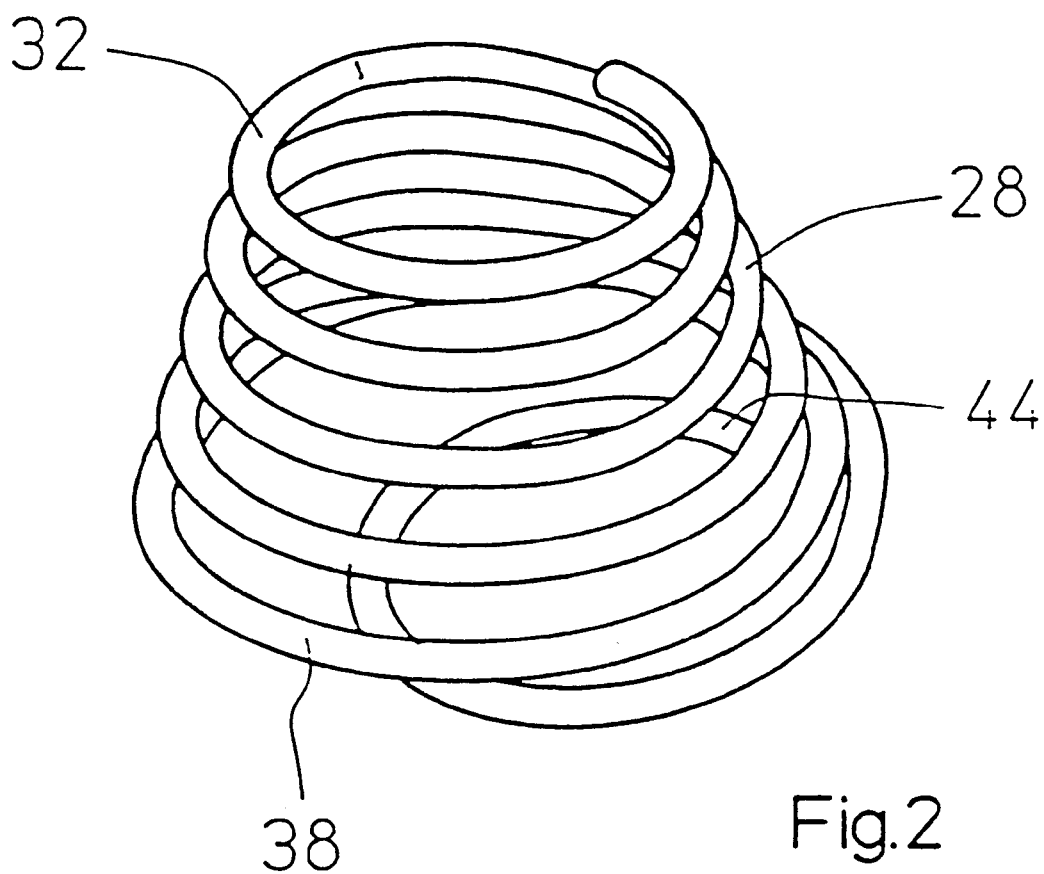
FIG. 2, a perspective view of the valve spring of the piston pump shown in FIG. 1, on a different scale.

In FIG. 2, the helical spring acting as a valve spring 28, wound frustoconically of metal wire and widening from its smaller-diameter end 32 of the winding to its larger-diameter end 38 of the winding, is shown in perspective on a larger scale. The helical spring continues, past its larger-diameter end 38 of the winding, in the form of a smaller diameter stroke limiting portion (indent) 44, which extends markedly inward, past but close to a longitudinal axis of the valve spring 28. The valve closing body 26, with its tang 34, meets this stroke limiting portion 44 when the valve is maximally opened, thereby limiting the valve stroke in this way. It is not absolutely necessary that the valve spring 28 be conically wound. What is essential is that it has both a smaller-diameter end 32 of the winding for engagement with the groove of the valve closing body 34 and a larger-diameter end 38 of the winding for contact with the spring seat face 40.

The installation of the valve closing body 26 with the valve spring 28 mounted on it is effected axially of the piston 12, from the conically beveled mouth 46 of the longitudinal bore 18. The conical embodiment of the mouth 46 causes a radial compression of the larger-diameter end 38 of the winding of the valve spring 28, and as a result that end passes through the inner flange 42 in the piston 12, spreads elastically at the inside thereof, and thereby comes to rest on the spring seat face 40.

An outlet valve accommodated in a blind bore 48 in the cylinder 16 is mounted in an end wall 50 of the cylinder bore 14 opposite the mouth 46 of the longitudinal bore 18 of the piston 12. As the valve closing body, the outlet valve has a valve ball 52, which is pressed in the direction of the piston 12 against a second valve seat face 56 by a helical compression spring 54 that is supported on the bottom of the blind bore 48. This valve seat face 56 of the outlet valve is located on a valve seat part 60, provided with an axial bore 58, that is mounted in a steplike widened portion of the blind bore 48 by caulking an undercut at 62 of the cylinder end wall 50. The undercut forms an inner annular shoulder or protruding lugs, could be formed along the opening. A transverse bore 64 discharges, as a fluid outlet, into the blind bore 58.

The cylinder bore diameter of the piston pump 10, in the exemplary embodiment of the invention shown and described, is approximately 8 mm. The piston pump 10 of the invention is intended for use in a hydraulic block for controlling a brake system equipped with ABS and optionally with traction control (ASR).

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A piston pump, comprising a piston (12) that is driven to execute a reciprocating motion and that has a longitudinal blind bore (18), said blind bore communicates via conduits (22) with a fluid supply, a valve seat formed in an interior of said longitudinal blind bore, a valve closing body (26) in said interior of said longitudinal body, a helical compression spring, said valve closing body (26) is pressed against said valve seat (24) formed in the interior of the longitudinal blind bore (18) by said helical compression spring, said helical compression spring has a larger-diameter end (38) of —a— helical winding and a smaller-diameter end (32) of —said — winding, wherein the smaller-diameter end (32) of the valve spring winding, engages the valve closing body (26), the larger-diameter end (38) of the valve spring winding is braced on a spring seat (40), which is formed on a pressure-side end of the piston (12) —as— an undercut in the longitudinal bore (18) of said piston, —and the larger-diameter end (38) of the winding merges with an inward-extending stroke limiting portion (44) of smaller diameter.

2. A piston pump in accordance with claim 1, in which the spring seat (40) is formed by a fully encompassing inner annular shoulder or by lugs that protrude into the longitudinal bore (18).

3. A piston pump in accordance with claim 1, in which the spring seat (40) is an integral part of the longitudinal blind bore of the piston (12).

4. A piston pump in accordance with claim 2, in which the spring seat (40) is an integral part of the longitudinal blind bore of the piston (12).

5. A piston pump in accordance with claim 2, in which the larger-diameter end (38) of the winding merges with an inward-extending stroke limiting portion (44) of smaller diameter.

6. A piston pump in accordance with claim 3, in which the larger-diameter end (38) of the winding merges with an inward-extending stroke limiting portion (44) of smaller diameter.

7. A piston pump in accordance with claim 1, in which the stroke limiting portion (44) is axially offset from the larger-diameter end (38) of the winding.

8. A piston pump in accordance with claim 5, in which the stroke limiting portion (44) is axially offset from the larger-diameter end (38) of the winding.

9. A piston pump in accordance with claim 6, in which the stroke limiting portion (44) is axially offset from the larger-diameter end (38) of the winding.

10. A piston pump in accordance with claim 1, in which the valve closing body (26) includes outward-protruding centering ribs (36).

11. A piston pump in accordance with claim 2, in which the valve closing body (26) includes outward-protruding centering ribs (36).

12. A piston pump in accordance with claim 3, in which the valve closing body (26) includes outward-protruding centering ribs (36).

13. A piston pump in accordance with claim 4, in which the valve closing body (26) includes outward-protruding centering ribs (36).

14. A piston pump in accordance with claim 1, in which the valve closing body (26) includes outward-protruding centering ribs (36).

15. A piston pump in accordance with claim 7, in which the valve closing body (26) includes outward-protruding centering ribs (36).

16. A piston pump in accordance with claim 1, in which on a side remote from —a— sealing face (30), the valve closing body (26) has a smaller dimensioned tang upon which the smaller diameter end of the valve spring (28) is secured and which forms a valve stroke limiter.

17. A piston pump in accordance with claim 2, in which on a side remote from —a— sealing face (30), the valve closing body (26) has a smaller dimensioned tang upon which the smaller diameter end of the valve spring (28) is secured and which forms a valve stroke limiter.

18. A piston pump in accordance with claim 3, in which on a side remote from —a— sealing face (30), the valve closing body (26) has a smaller dimensioned tang upon which the smaller diameter end of the valve spring (28) is secured and which forms a valve stroke limiter.

19. A piston pump in accordance with claim 1, in which on a side remote from —a— sealing face (30), the valve closing body (26) has a smaller dimensioned tang upon which the smaller diameter end of the valve spring (28) is secured and which forms a valve stroke limiter.

* * * * *